(12) United States Patent
Chi (10) Patent No.: US 7,292,434 B2
(45) Date of Patent: Nov. 6, 2007

(54) REPLACEABLE LIQUID CRYSTAL DISPLAY BACK PLATE FOR PORTABLE COMPUTER

(75) Inventor: Chin-Jui Chi, Bade (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 337 days.

(21) Appl. No.: 11/062,841

(22) Filed: Feb. 23, 2005

(65) Prior Publication Data

US 2005/0213291 A1  Sep. 29, 2005

(30) Foreign Application Priority Data

Mar. 26, 2004  (TW) .............................. 93204700 U (51) Int. Cl.
*G06F 1/16* (2006.01)
(52) U.S. Cl. .......................... 361/681; 349/58; 349/60; 361/679
(58) Field of Classification Search .................. 349/50, 349/60, 58; 361/681, 679
See application file for complete search history.

(56) References Cited

U.S. PATENT DOCUMENTS

| | | | | |
|---|---|---|---|---|
| 5,805,416 | A | * | 9/1998 | Friend et al. ................ 361/686 |
| 6,003,052 | A | * | 12/1999 | Yamagata .................... 708/100 |
| 6,842,335 | B1 | * | 1/2005 | Hanson et al. .............. 361/683 |

* cited by examiner

*Primary Examiner*—Lisa Lea-Edmonds
*Assistant Examiner*—Ingrid Wright
(74) *Attorney, Agent, or Firm*—Rosenberg, Klein & Lee (57) ABSTRACT

A replaceable liquid crystal display back plate for portable computer includes a back plate forming part of a housing of a liquid crystal display of a portable computer and being provided on an outer surface with a flat recess; a replaceable cover plate adapted to fitly set in and cover the flat recess on the back plate; and a locking mechanism operable between a locked position, in which the replaceable cover plate is locked to the flat recess, and an unlocked position, in which the replaceable cover plate is separable from the flat recess to be replaced with another one. The replaceable cover plate is made of a transparent material, and may have a pictorial layer provided between it and the flat recess.

10 Claims, 7 Drawing Sheets

REPLACEABLE LIQUID CRYSTAL DISPLAY BACK PLATE FOR PORTABLE COMPUTER

FIELD OF THE INVENTION

The present invention relates to an improvement made to a liquid crystal display (LCD) for portable computer, and more particularly to a replaceable LCD back plate for portable computer.

BACKGROUND OF THE INVENTION

A display is an important output device for a computer system, via which a user could know and control the current operating state of the computer system and give instructions to the computer system based on the data and messages shown on the display. Currently, most of the available portable computers use a liquid crystal display (LCD). The LCDs used with the conventional portable computers provide only one simple function of displaying information. Therefore, the current LCDs usually have a housing designed to provide a room for an LCD panel, various circuit components, and necessary structural parts thereof.

In recent years, there have been many improvements made to the LCDs in an attempt to enhance their display function and increase their added value.

However, it is difficult to have any breakthrough in the design of the LCD housing for portable computer due to the limitation on space set by the electronic circuits and other structural parts of the LCD to the housing thereof.

Meanwhile, since compact volume and low weight are two important factors being considered by consumers when they purchase a portable computer, most portable computer manufacturers would not particularly add too many functional members to the LCD that would increase the volume and weight of the LCD. Instead, the manufacturers would only utilize as much as possible the limited space available from the current LCD housing.

Under this circumstance, a personalized design for the LCD housing has become an important approach to break through the conventional structural design for the LCD and to increase the added value thereof.

SUMMARY OF THE INVENTION

It is therefore a primary object of the present invention to provide a replaceable liquid crystal display (LCD) back plate for portable computer, so that a user may freely show different colors, pictures, or shapes on the LCD back plate.

Another object of the present invention is to provide a replaceable liquid crystal display (LCD) back plate for portable computer, so that a portable computer has diversified appearances to effectively attract consumers.

A further object of the present invention is to provide a replaceable liquid crystal display (LCD) back plate for portable computer, so that a portable computer may have a personalized appearance simply by associating the LCD back plate with a user's most favorite colors, pictures, photos, etc.

To achieve the above and other objects, the replaceable liquid crystal display (LCD) back plate for portable computer according to the present invention includes a back plate forming part of a housing of an LCD of a portable computer and being provided on an outer surface with a flat recess; a replaceable cover plate adapted to fitly set in and cover the flat recess on the LCD back plate; and a locking mechanism operable between a locked position, in which the replaceable cover plate is locked to the flat recess, and an unlocked position, in which the replaceable cover plate is separable from the flat recess to be replaced with another one.

In a preferred embodiment of the present invention, the replaceable cover plate is made of a transparent material, and a pictorial layer may be provided between the replaceable cover plate and the flat recess.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
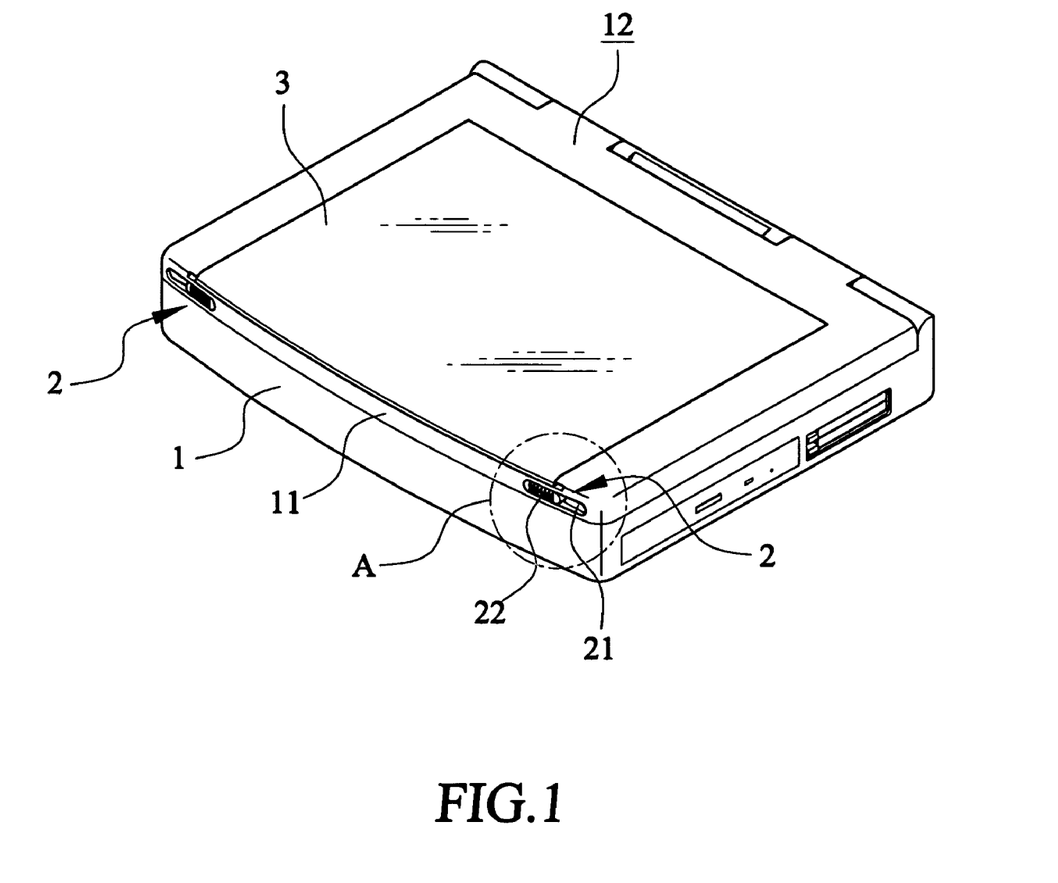
FIG. 1 is an assembled perspective view of a replaceable liquid crystal display (LCD) back plate for portable computer according to a first embodiment of the present invention.
Figure 2:
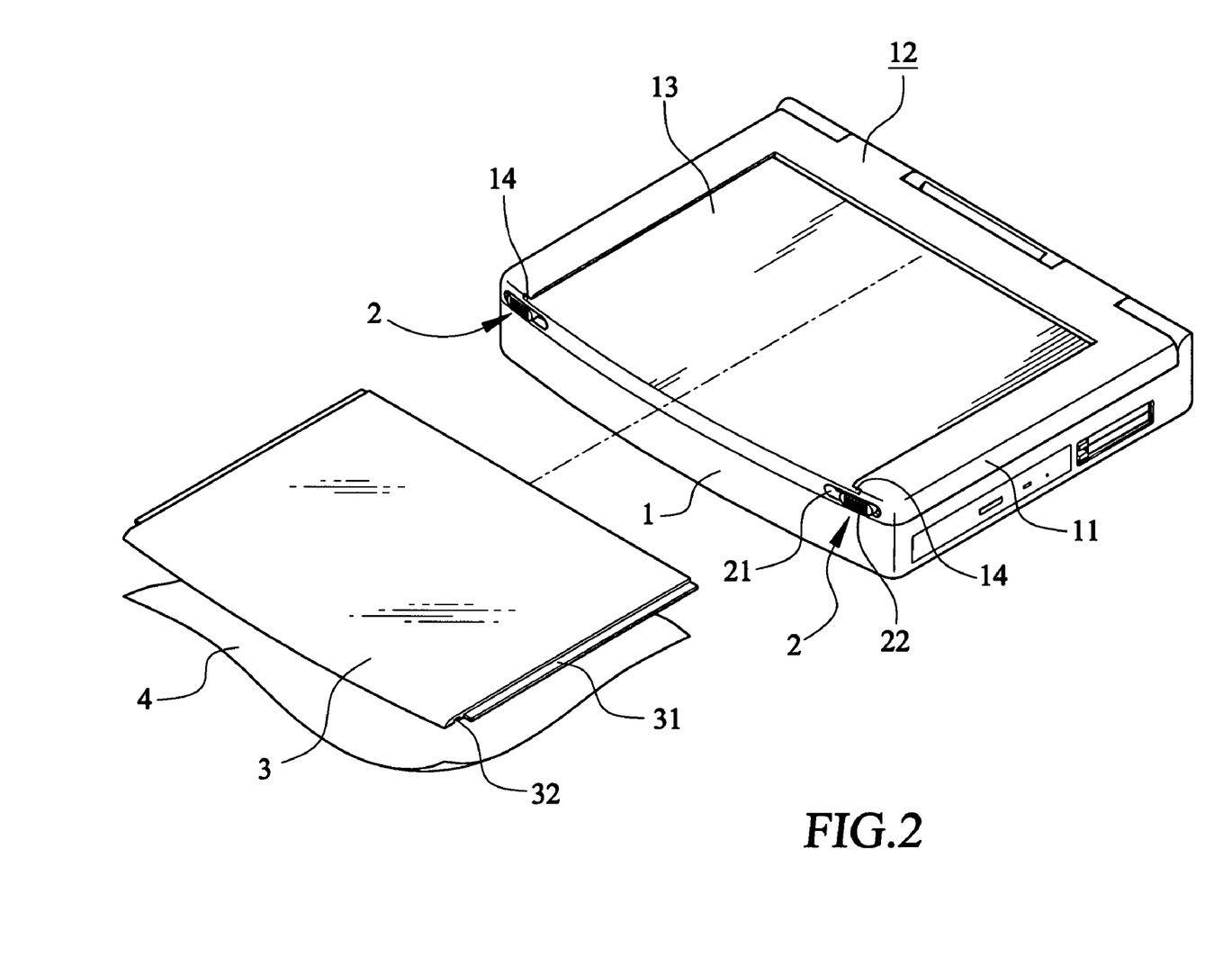
FIG. 2 is an exploded perspective view showing a replaceable cover plate of the LCD back plate for portable computer of FIG. 1 is separated from the LCD back plate.

Please refer to FIGS. 1 and 2 that are assembled and exploded perspective views, respectively, of a replaceable liquid crystal display (LCD) back plate for portable computer according to a first embodiment of the present invention. As shown, the present invention mainly includes a back plate 12 forming part of a housing of a LCD 11 of a portable computer 1. The back plate 12 is provided on an outer surface with a flat recess 13, to which a replaceable cover plate 3 is detachably locked via a locking mechanism. The flat recess 13 may occupy the whole area or only a part of the outer surface of the back plate 12 of the LCD 11.

In the illustrated first embodiment, the locking mechanism includes a guide way 14 provided at each of two opposed laterally inner sides of the flat recess 13, and a locking gear 2 provided near a front end of each guide way 14. Since the two locking gears 2 are symmetrically provided in the present invention, only one of them is described in details herein.

The replaceable cover plate 3 is dimensioned for fitly setting in and thereby covering the whole flat recess 13 on the back plate 12 of the LCD 11, and is provided at two laterally outer sides with a guide rail 31 each to correspond to the guide way 14 of the flat recess 13. Thus, the replaceable cover plate 3 may be manually operated to slide into the flat recess 13 through engagement of the guide rails 31 with the guide ways 14 to flush with the outer surface of the back plate 12 of the LCD 11.

Figure 3:
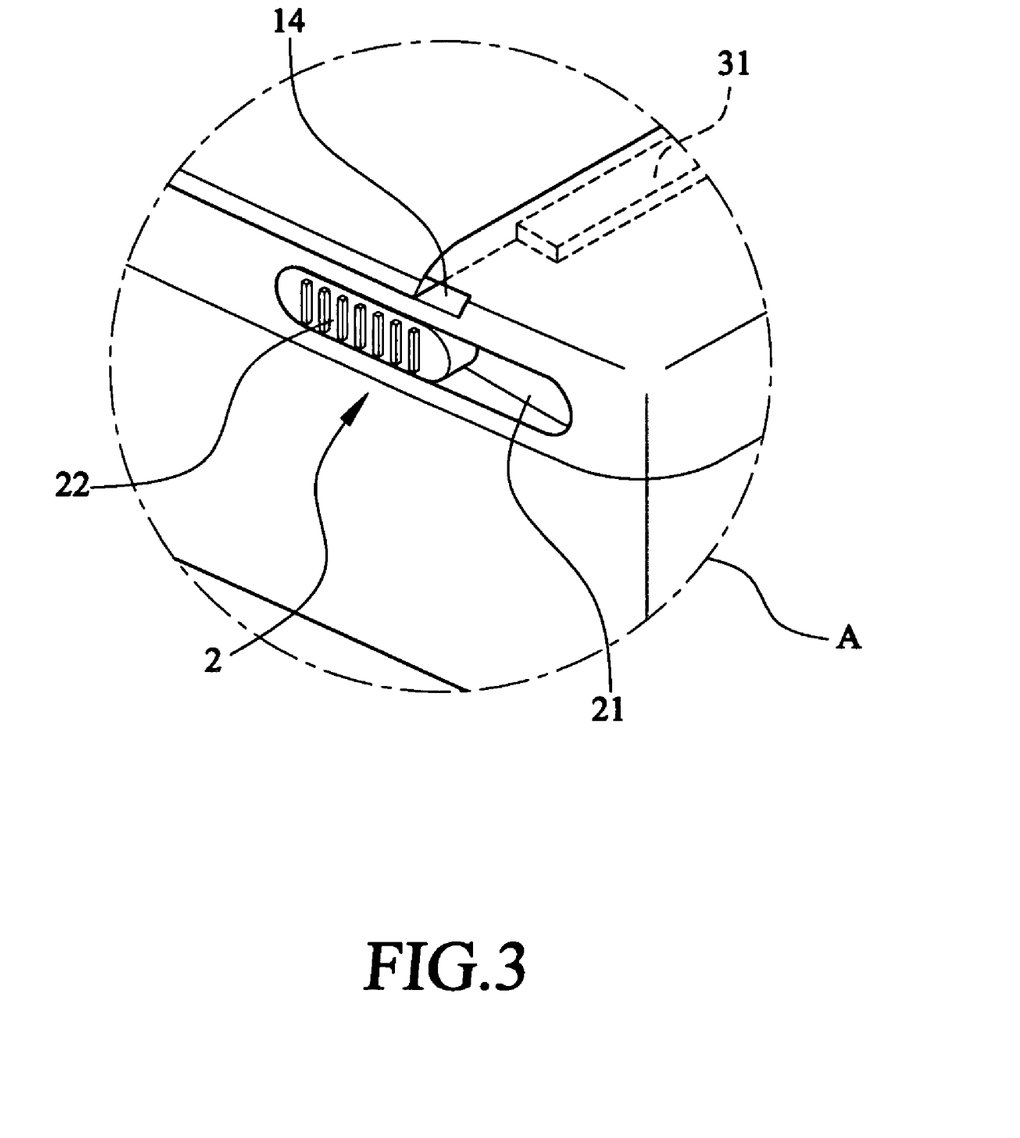
FIG. 3 is an enlarged view of the encircled area A in FIG. 1.
Figure 4:
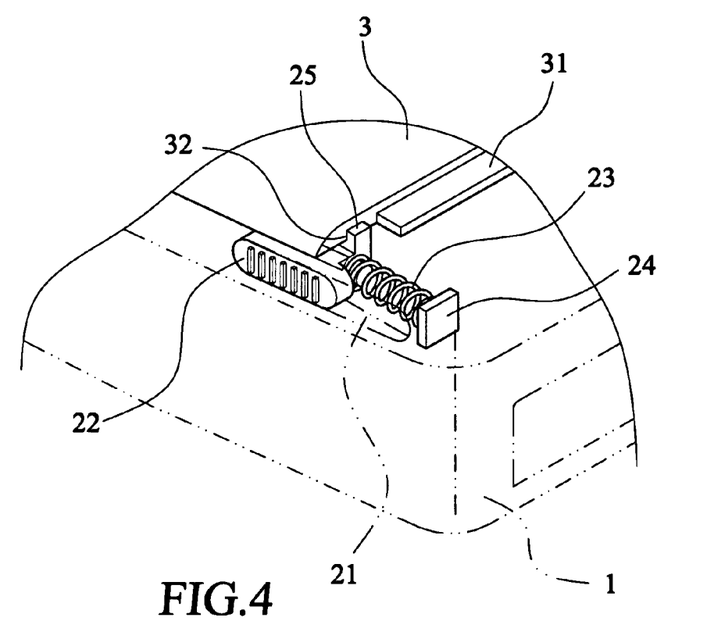
FIG. 4 is a fragmentary and enlarged perspective view of a locking gear for the present invention in a locked position to lock the replaceable cover plate to the LCD back plate for portable computer.
Figure 5:
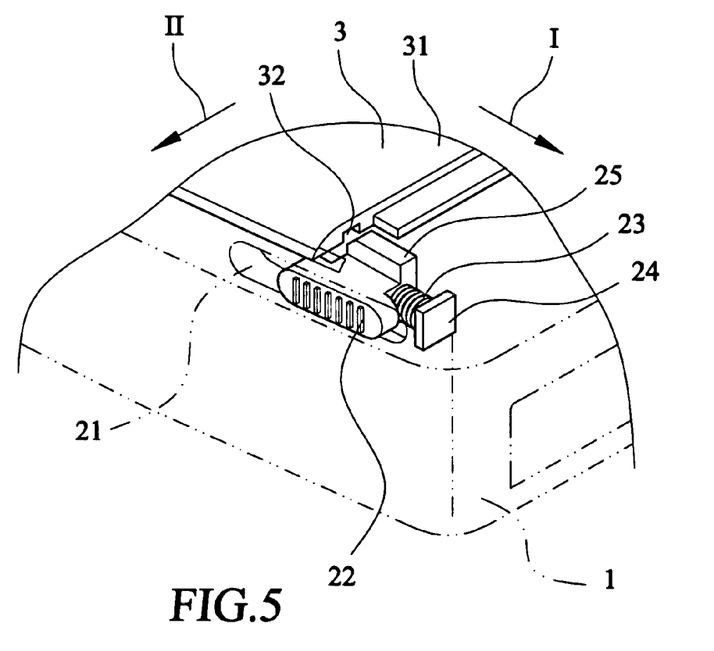
FIG. 5 is a fragmentary and enlarged perspective view of the locking gear for the present invention in an unlocked position to allow separation of the replaceable cover plate from the LCD back plate for portable computer.

Please refer to FIG. 3 that is an enlarged view of the encircled area A of FIG. 1 showing the locking gear 2, and to FIGS. 4 and 5 that show the locking gear 2 in a locked and an unlocked position, respectively.

The locking gear 2 includes a slot 21 provided at a front outer end of the back plate 12 of the LCD 11, a slide 22 movably mounted in the slot 21 to be manually operated by a user to laterally slide in the slot 21, and an elastic element 23 located behind the slot 21 and the slide 22 with an end pressed against a rear lateral side of the slide 22 and the other end pressed against a fixed location inside the housing of the LCD 11, such as a stopper 24 or a suitable point in the housing of the LCD 11.

The slide 22 not subjected to an external force from a user is normally pushed by the elastic element 23 to a locked position (it is the left end of the slot 21 in FIG. 4). However, when the slide 22 is laterally pushed outward in the slot 21 to an unlocked position (it is the right end of the slot in FIG. 5), the slide 22 would compress the elastic element 23 against the stopper 24.

The slide 22 is provided at a rear upper surface with an upward projected rib 25. When the slide 22 is in the locked position as shown in FIG. 4, the projected rib 25 is located in and fitly engaged with a retaining recess 32 provided at each lateral side of the replaceable cover plate 3 near a lower front edge thereof. And, when the slide 22 is in the unlocked position as shown in FIG. 5, the projected rib 25 is disengaged from and located outside the retaining recess 32.

In a preferred embodiment of the present invention, the replaceable cover plate 3 is made of a transparent material, and a pictorial layer 4 is provided and interposed between the replaceable cover plate 3 and the flat recess 13 on the back plate 12 of the LCD 11. The pictorial layer 4 may be selected from the group consisting of differently printed ornamental pictures, photos, company logos, words, geometrical patterns, scenic pictures showing different seasons, and differently colored sheets. Alternatively, the pictorial layer 4 may be attached to or sandwiched in the replaceable cover plate 3, so that a user may create changeful visual effects for the back plate 12 of the LCD 11 simply by changing the pictorial layer 4. It is also possible for a user to form the pictorial layer 4 by directly painting, printing, or putting a label on one surface of the replaceable cover plate 3.

When the slide 22 is moved to the locked position as shown in FIG. 4, the locking gear 2 is adapted to firmly hold the replaceable cover plate 3 to the flat recess 13 on the back plate 12 of the LCD 11. And, when the slide 22 is pushed in a first direction I to the unlocked position as shown in FIG. 5, the projected rib 25 of the slide 22 is disengaged from the retaining recess 32 on the replaceable cover plate 3, and a user may slide the replaceable cover plate 3 in a second direction II to move the same out of the guide ways 14 at two laterally inner sides of the flat recess 13, so that another one of desired replaceable cover plate may be slid into the guide ways 14 to associate with the flat recess 13 on the back plate 12 and be locked in place using the locking gears 2, ax shown in FIG. 4.

Figure 6:
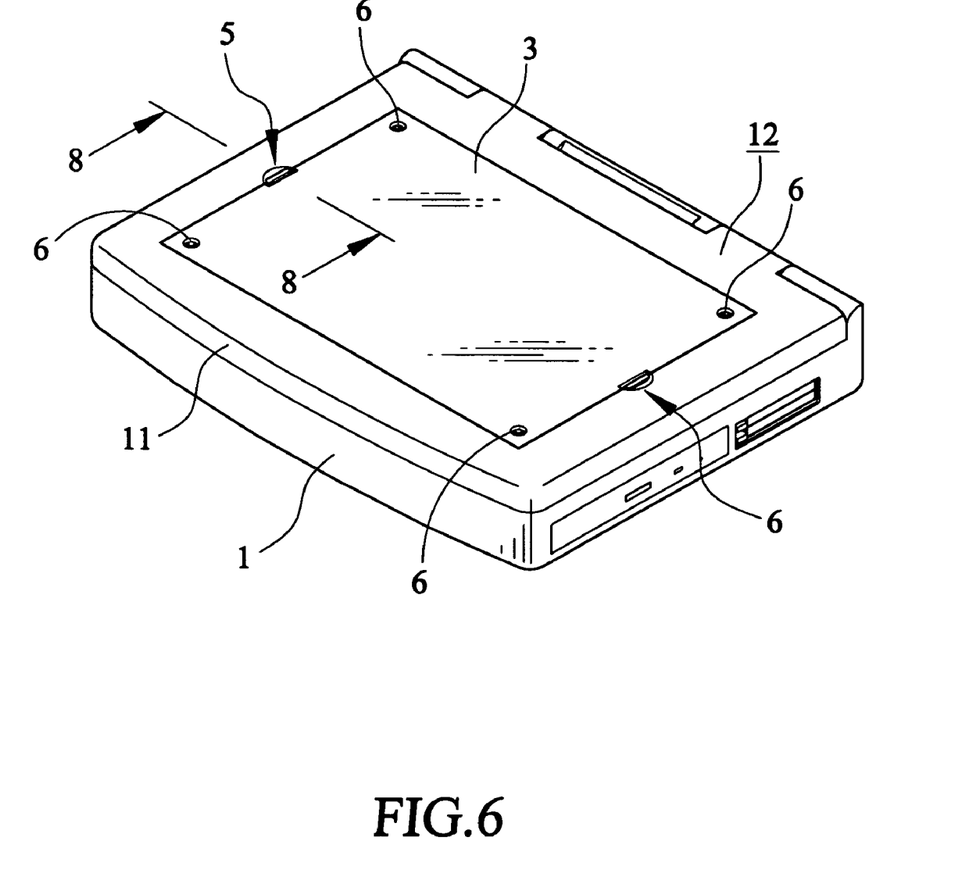
FIG. 6 is an assembled perspective view of a replaceable LCD back plate for portable computer according to a second embodiment of the present invention.
Figure 7:
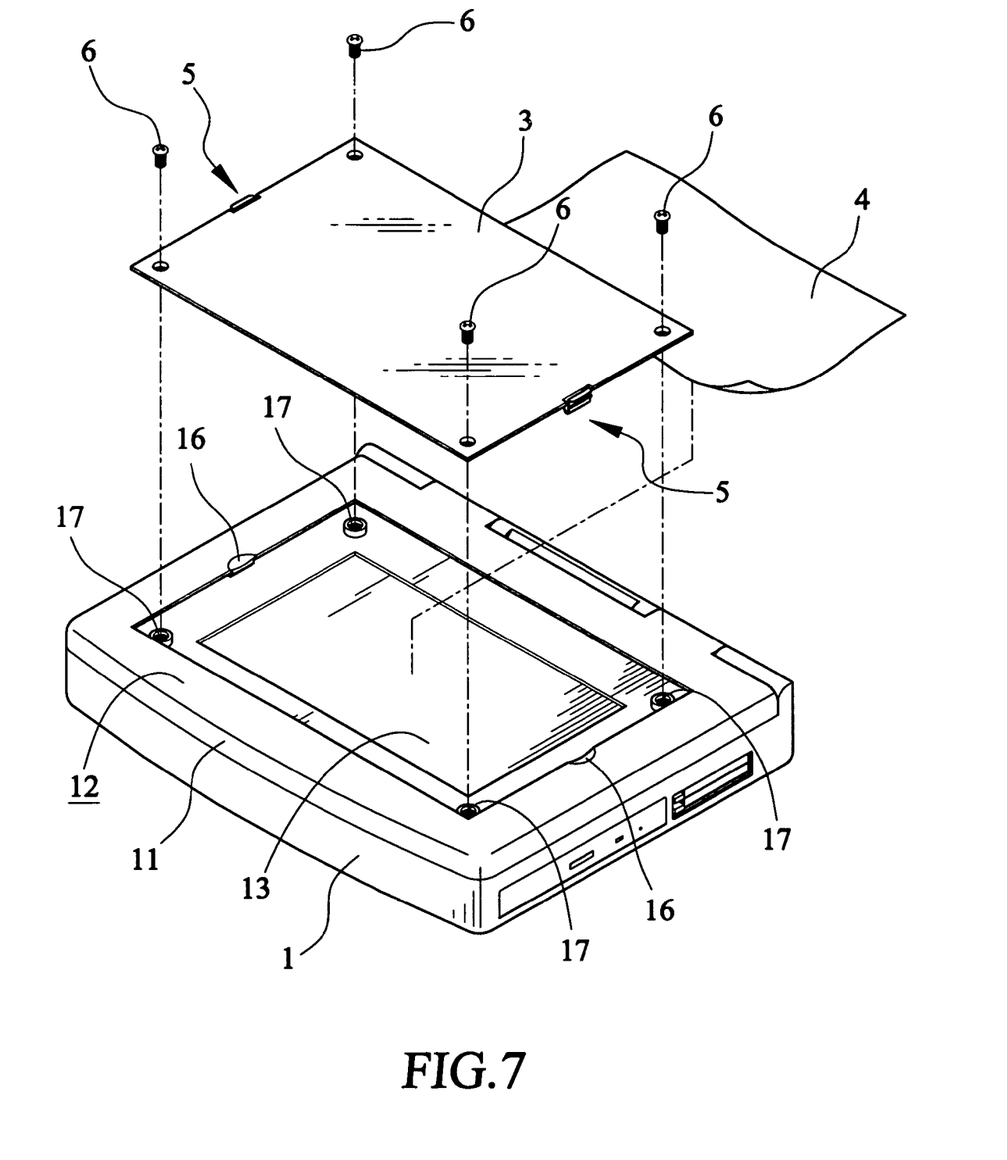
FIG. 7 is an exploded perspective view showing a replaceable cover plate of the LCD back plate for portable computer of FIG. 6 is separated from the LCD back plate.
Figure 8:
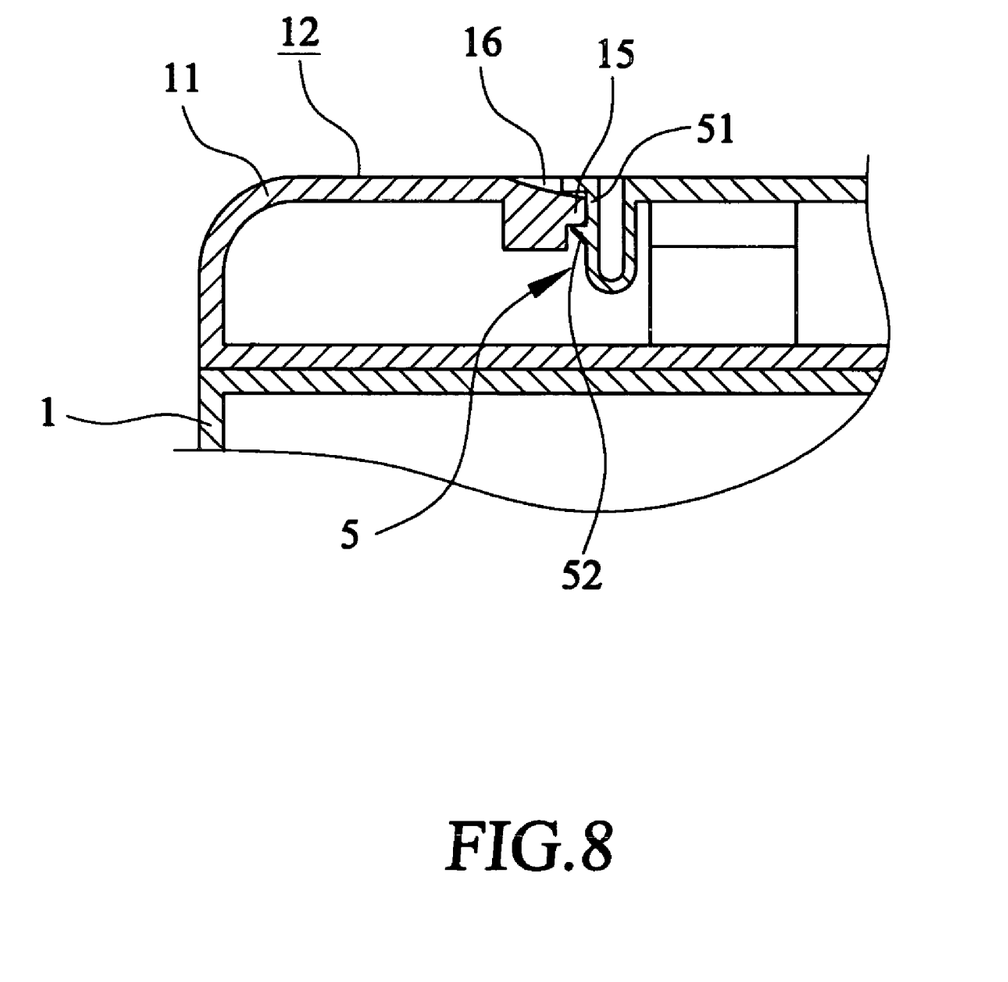
FIG. 8 is an enlarged sectional view taken along line 8-8 of FIG. 6.

FIGS. 6 and 7 are assembled and exploded perspective views, respectively, of a replaceable LCD back plate for portable computer according to a second embodiment of the present invention; and FIG. 8 is a fragmentary and enlarged sectional view taken along line 8-8 of FIG. 6. In the second embodiment, structural members identical or similar to those in the first embodiment are denoted with reference numerals the same as that used in the first embodiment.

In the second embodiment, the back plate 12 forming part of the housing of the LCD 11 for the portable computer 1 is also provided on an outer surface with a flat recess 13, to which a replaceable cover plate 3 is detachably locked via a locking mechanism. As in the first embodiment, a pictorial layer 4 may be provided between the replaceable cover plate 3 and the flat recess 13 on the LCD back plate 12.

The locking mechanism in the second embodiment includes a pair of elastic fasteners 5 separately and correspondingly mounted to two opposite lateral outer sides of the replaceable cover plate 3. Please refer to FIG. 8. Each of the elastic fasteners 5 includes a spring plate 51, and a barb section 52 formed at a laterally outer side of the spring plate 51. The locking mechanism also includes a catch 15 provided on the LCD back plate 12 at each laterally outer side thereof corresponding to the elastic fastener 5. An inward and downward curved recess 16 is formed immediately above the catch 15 close to the elastic fastener 5.

When the replaceable cover plate 3 is vertically downward set in the flat recess 13 on the LCD back plate 12, the barb sections 52 of the two elastic fasteners 5 pass the catches 15 on the back plate 12 and are then retained thereto to firmly lock the replaceable cover plate 3 to the flat recess 13 and accordingly the back plate 12 of the LCD 11. And, when it is desired to remove the replaceable cover plate 3 and replace it with another one, simply laterally inward push the spring plates 51 of the two elastic fasteners 5 at the same time to disengage the barb sections 52 from the catches 15 on the back plate 12 of the LCD 11. At this point, the whole replaceable cover plate 3 could be easily lifted from the flat recess 13. The curved recesses 16 enable a user to easily contact with and inward push the spring plates 51 of the elastic fasteners 5 to lift the replaceable cover plate 3.

In addition to the elastic fasteners 5, a plurality of locking screws 6 may be further provided to screw through holes provided at predetermined points on the replaceable cover plate into internally threaded posts 17 correspondingly provided on the flat recess 13, so as to more firmly lock the replaceable cover plate 3 to the flat recess 13 on the back plate 12 of the LCD 11.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A replaceable liquid crystal display back plate for a portable computer, comprising:
   a back plate forming part of a housing of a liquid crystal display of the portable computer and being provided on an outer surface with a flat recess;
   a replaceable cover plate adapted to fitly set in and cover the flat recess on the back plate; and
   a locking mechanism operable between a locked position, in which the replaceable cover plate is associated with and locked to the flat recess on the back plate of the liquid crystal display, and an unlocked position, in which the replaceable cover plate is separable from the flat recess on the back plate of the liquid crystal display to be replaced with another one;
   wherein the replaceable cover plate is made of a transparent material, and a pictorial layer is provided between the replaceable cover plate and the flat recess on the back plate of the liquid crystal display.

2. The replaceable liquid crystal display back plate as claimed in claim 1, wherein the flat recess occupies a whole area of the back plate of the liquid crystal display.

3. The replaceable liquid crystal display back plate as claimed in claim 1, wherein the flat recess occupies a part of the back plate of the liquid crystal display.

4. A replaceable liquid crystal display back plate for a portable computer, comprising:
   a back plate forming part of a housing of a liquid crystal display of the portable computer and being provided on an outer surface with a flat recess;
   a replaceable cover plate adapted to fitly set in and cover the flat recess on the back plate; and
   a locking mechanism operable between a locked position, in which the replaceable cover plate is associated with and locked to the flat recess on the back plate of the liquid crystal display, and an unlocked position, in which the replaceable cover plate is separable from the flat recess on the back plate of the liquid crystal display to be replaced with another one;
   wherein the locking mechanism comprises:
      a pair of guide ways provided at two opposed laterally inner sides of the flat recess on the back plate of the liquid crystal display;
      a pair of guide rails provided at two laterally outer sides of the replaceable cover plate corresponding to the guide ways formed on the flat recess; and
      a pair of locking gears adapted to move into the locked or the unlocked position through manual operation;
      whereby when the replaceable cover plate is manually slid along the guide ways into the flat recess, the locking gears may be moved into the locked position to lock the replaceable cover plate to the flat recess; and when the locking gears are moved into the unlocked position, the replaceable cover plate could be slid out of the guide ways to separate from the flat recess on the back plate of the liquid crystal display.

5. The replaceable liquid crystal display back plate as claimed in claim 4, wherein each of the locking gears comprises:
   a slot provided at a front outer end of the back plate of the liquid crystal display;
   a slide movably mounted in the slot to be manually operated to laterally slide in the slot; and
   an elastic element located behind the slot and the slide with an end pressed against a rear lateral side of the slide and the other end pressed against a fixed location inside the housing of the liquid crystal display; and
   said slide not subjected to an external force being normally pushed by the elastic element to the locked position, and the slide subjected to a laterally outward push in the slot being moved into the unlocked position to compress the elastic element.

6. The replaceable liquid crystal display back plate as claimed in claim 5, wherein the slide is provided at a rear upper surface with an upward projected rib; the projected rib is located in and fitly engaged with a retaining recess provided at each lateral side of the replaceable cover plate near a lower front edge thereof when the slide is in the locked position; and the projected rib being disengaged from and located outside the retaining recess when the slide is in the unlocked position.

7. A replaceable liquid crystal display back plate for a portable computer, comprising:
   a back plate forming part of a housing of a liquid crystal display of the portable computer and being provided on an outer surface with a flat recess;
   a replaceable cover plate adapted to fitly set in and cover the flat recess on the back plate; and
   a locking mechanism operable between a locked position, in which the replaceable cover plate is associated with and locked to the flat recess on the back plate of the liquid crystal display, and an unlocked position, in which the replaceable cover plate is separable from the flat recess on the back plate of the liquid crystal display to be replaced with another one;
   wherein the replaceable cover plate is formed on a surface with a pictorial layer.

8. A replaceable liquid crystal display back plate for a portable computer, comprising:
   a back plate forming part of a housing of a liquid crystal display of the portable computer and being provided on an outer surface with a flat recess;
   a replaceable cover plate adapted to fitly set in and cover the flat recess on the back plate; and
   a locking mechanism operable between a locked position, in which the replaceable cover plate is associated with and locked to the flat recess on the back plate of the liquid crystal display, and an unlocked position, in which the replaceable cover plate is separable from the flat recess on the back plate of the liquid crystal display to be replaced with another one;
   wherein the locking mechanism comprises:
      a pair of elastic fasteners separately and correspondingly mounted to two opposite laterally outer sides of the replaceable cover plate; and
      a pair of catches provided on the back plate of the liquid crystal display at two laterally outer sides thereof corresponding to the elastic fasteners; and each of the elastic fasteners including a spring plate and a barb section formed at a laterally outer side of the spring plate;
      whereby when the replaceable cover plate is vertically downward set in the flat recess on the liquid crystal display back plate, the barb sections of the two elastic fasteners pass the catches on the liquid crystal display back plate and are retained thereto to firmly lock the replaceable cover plate to the flat recess and accordingly the back plate of the liquid crystal display; and when the spring plates of the two elastic fasteners are laterally inward pushed at the same time to disengage the barb sections from the catches on the back plate of the liquid crystal display, the replaceable cover plate could be separated from the flat recess on the liquid crystal display back plate.

9. The replaceable LCD back plate as claimed in claim 8, further comprising an inward and downward curved recess provided above each the catch close to the elastic fastener on the liquid crystal display back plate.

10. The replaceable liquid crystal display back plate as claimed in claim 8, further comprising a plurality of locking screws that are screwed through holes provided at predetermined points on the replaceable cover plate into internally threaded posts correspondingly provided on the flat recess, so as to more firmly lock the replaceable cover plate to the flat recess on the back plate of the liquid crystal display.

* * * * *